United States Patent Office 3,755,424
Patented Aug. 28, 1973

3,755,424
2-DIALKYLAMINO-1,3-BIS-(ALKOXYALKYL-
THIO)PROPANES
Fred Kuhnen, Weil am Rhine, Germany, assignor to
Sandoz Ltd. (also known as Sandoz AG) Basel, Switzerland
No Drawing. Filed Apr. 5, 1972, Ser. No. 241,453
Claims priority, application Switzerland, Apr. 13, 1971,
5,262/71
Int. Cl. C07c 149/24
U.S. Cl. 260—501.19        7 Claims

ABSTRACT OF THE DISCLOSURE

The present invention concerns 2-dialkylamino-1,3-bis-(alkoxyalkylthio)propane derivatives of the formula:

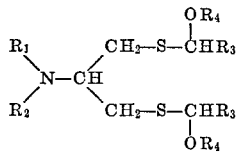

wherein
$R_1$ and $R_2$ are each alkyl,
$R_3$ is hydrogen or alkyl and
$R_4$ is alkyl.

The compounds possess insecticidal and fungicidal properties.

---

The present invention relates to 2-dialkylamino-1,3-bis-(alkoxyalkylthio)propane derivatives.

The present invention provides compounds of Formula I,

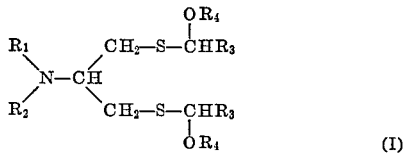

wherein
$R_1$ and $R_2$, which are the same or different, are each alkyl of 1 to 5 carbon atoms.
$R_3$ is hydrogen or alkyl of 1 to 5 carbon atoms, and
$R_4$ is alkyl of 1 to 3 carbon atoms.

When $R_1$, $R_2$, $R_3$ or $R_4$ is alkyl, this may be straight or branched chain alkyl.

The present invention also provides a process for the production of a compound of Formula I which comprises reacting a compound of Formula II,

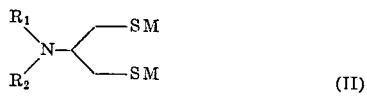

wherein
$R_1$ and $R_2$ are as defined above and
M is an alkali metal, preferably sodium,
with an equivalent amount of a compound of Formula III,

wherein
$R_3$ and $R_4$ are as defined above and
X is chlorine or bromine, preferably chlorine,
preferably in an inert atmosphere.

The reaction may, for example, be effected as follows, viz:

To the compound of Formula II either as a suspension in an appropriate suspension medium e.g. acetonitrile, or as a solution in an appropriate solvent e.g. dimethylformamide, in an inert atmosphere e.g. nitrogen, is added two equivalents of the compound of Formula III preferably while stirring and below room temperature e.g. between 10 and 20° C. over a period of for example 5 to 20 minutes. The reaction may conveniently be allowed to proceed over a period of between for example 4 and 16 hours, preferably with stirring. Working up may be effected in conventional manner.

The compounds of Formula II employed as starting material are described in the literature. They may, for example, be obtained by reacting a compound of Formula IV,

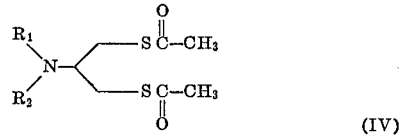

wherein $R_1$ and $R_2$ are as defined above, with an alkali metal alcoholate such as sodium methylate, in an alcohol such as methanol. The compounds of Formula II obtained in this manner are preferably employed directly in the process of the invention without isolation thereof.

The compounds of Formula IV may be obtained in known manner by reacting a compound of Formula V,

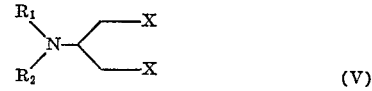

wherein $R_1$, $R_2$ and X are as defined above, with a salt of thioacetic acid, preferably an alkali metal or trialkylammonium salt thereof.

The compounds of Formulae III and V are described in the literature.

The compounds of Formula I may exist either in free base or acid addition salt forms. Acid addition salt forms may be obtained from free base forms in manner known per se and vice versa.

The compounds of Formula I in free base form are generally colourless to slightly coloured oils. They are generally soluble to some extent in organic solvents. The compounds of Formula I in acid addition salt form are generally crystalline and may be characterized by their melting points.

The compounds of Formula I are useful as insecticides as indicated by the following tests, viz:

Test (i).—Insecticidal effect against *Bruchidius obtectus* (bean weevil), contact effect Petri dishes having a diameter of 7 cm. are coated by spraying with 0.1 to 0.2 cc. of an emulsion containing 0.0125% of a compound of Formula I. After drying the coating for about 4 hours, 10 *Bruchidius imagos* are placed in each dish which is covered with a lid comprising a fine mesh brass wire grid. The insects are kept without food at room temperature. After 48 hours the rate of mortality is determined.

Test (ii).—Insecticidal effects against *Ephestia keuhniella* (flour moth), contact effect Petri dishes having a diameter of 6 cm., each containing 10 caterpillars 10 to 12 mm. in length, are coated by spraying with 0.1 to 0.2 cc. of an emulsion containing 0.05% of a compound of Formula I. The dishes are then covered with a fine mesh brass wire grid. After drying the coating a wafer is given as food and renewed as required. After 5 days the rate of mortality is determined by counting the live and dead insects.

Test (iii).—Insecticidal effect against *Calandra* (*Sitophilus*) *granaria* (grain weevil), contact effect Petri dishes having a diameter of 10 cm. are coated on a turn table through three turns under a fixed spraying nozzle, with a liquor of a compound of Formula I in a concentration of 500 p.p.m. After drying the coating for 4 hours 30 imagos are placed in the dish. After 1 to 2 days the dead insects are counted.

The compounds are also useful as fungicides as indicated by the following tests, viz:

Fungicidal effect against *Uromyces phaseoli* (bean rust), systemic effect: Potted bean plants (*Phaseolis vulgaris*) are watered in the 2-leaf stage with 70 cc. of an emulsion containing 0.05% of a compound of Formula I such that the green parts of the plants remain untouched. After 24 hours the plants are infected with spores of the bean rust (*Uromyces phaseoli*). They are kept for 2 days at 100% relative atmospheric humidity and subsequently for 10 days under normal laboratory conditions in artificial light, the infestation then being evaluated.

Fungicidal contact effect against *Uromyces phaseoli*: Potted bean plants in the 2-leaf stage are sprayed twice on a turn table by means of a spraying nozzle with spraying liquor containing 0.05% of a compound of Formula I (approximately 0.7 cc. per plant). The layer is allowed to dry off. After 24 hours the plants are sprayed with a suspension of Uromyces spores. Then they are kept for 2 days at 100% relative atmospheric humidity and subsequently for 10 days under normal laboratory conditions, infestation being then evaluated.

Fungicidal effect against *Erysiphe graminis* (barley blight) systemic effect: Barley plants (10 plants per pot) in the 1-leaf stage, the leaves having a length of 6 to 8 cm., are sprayed with spraying liquor containing 0.05% of a compound of Formula I such that the green parts of the plants remain untouched. After about 24 hours the plants are dusted with conidia of blight. Subsequently the plants are kept for 7 days at 60–80% relative atmospheric humidity and in constant light conditions. The fungicidal effect is then determined.

Fungicidal contact effect against *Erysiphe graminis*: Barley plants (10 plants per pot) in the 1-leaf stage, the leaves having a length of 6–8 cm., are sprayed all over on a turn table nearly to run off with a spraying liquor containing 0.05% of a compound of Formula I, by means of a spraying nozzle. The plants are thus covered with a thin layer of the liquor which does not run off. The liquor is allowed to dry off and the plants are dusted with conidia of blight after about 4 hours. Subsequently the plants are kept for 7 days at 60–80% relative atmospheric humidity and in constant light conditions. The fungicidal effect is then determined.

Furthermore, the compounds possess low toxicity in warm blooded animals as indicated by $LD_{50}$ determinations on male white rats.

The compouns are therefore particularly useful as insecticides and fungicides in animal buildings, e.g. stables, in houses e.g. in cellars and attics thereof, and in plant loci.

For the abovementioned use the amount of the compound to be applied will vary depending on the particular compound employed, the mode of application, ambient conditions and the effect desired. With regard to plant protection, in general satisfactory results are obtained when applied to a plant locus in an amount between 100 g. and 2 kg./hectare.

The compounds may be employed as a composition with insecticidal or fungicidal carriers and diluents in solid or liquid form e.g. spraying and dusting powders, strewing granulates, spraying liquids and aerosols.

Solid forms may include diluents and carriers such as diatomaceous earth, talc, kaolinite, attapulgite, pyrophyllite, artificial mineral fillers based on $SiO_2$ and silicates, limestone, decahydrate and plant material carriers such as walnut and flour. Adjuvants e.g. surfactants such as wetting and dispersing agents, e.g. sodium lauryl sulphate, sodium dodecyl benzenesulphonate, condensation products from naphthalene sulphonate and formaldehyde, polyglycol ether and lignin derivatives such as sulphite liquor, may also be included in the case of wettable powders to be applied as a water suspension. Granulates are produced by coating or impregnating granular carrier materials such as pumice, limestone, attapulgite and kaolinite with the compounds.

Liquid forms may include non-phytotoxic diluents and carriers such as alcohols, glycolic ethers, aliphatic and aromatic hydrocarbons e.g. xylene, alkyl naphthalenes and other petroleum distillates, and ketones e.g. cyclohexanone and isophorone. Adjuvants such as surface active agents, e.g. wetting and emulsifying agents such as polyglycol ether formed by the reaction of an alkylene oxide with high molecular weight alcohols, mercaptans or alkyl phenols, and/or alkyl benzene sulphonates, may be included in emulsion concentrate forms.

Aside from the abovementioned carriers, diluents and adjuvants, adjuvants such as stabilizing agents, deactivators (for solid forms with carriers having an active surface), agents for improving adhesiveness to surfaces treated, anticorrosives, defoaming agents and pigments may also be included.

Concentrate forms of compositions generally contain between 1 and 90% preferably between 5 and 50% by weight of active compound.

Application forms of composition generally contain between 0.02 and 90%, preferably between 0.1 and 20% by weight of active compound.

Examples of concentrate forms of composition will now be described.

(a) Emulsifiable concentrate: 25 parts by weight of a compound of Formula I are mixed with 25 parts by weight of isooctylphenyldecaglycol ether and 50 parts by weight of xylene, whereby a clear solution is obtained which may be readily emulsified in water. The concentrate may be diluted with water to the desired concentration.

(b) Emulsifiable concentrate: 25 parts by weight of a compound of Formula I are mixed with 30 parts by weight of isooctylphenyloctaether and 45 parts by weight of a petroleum fraction having a B.P. of 210–280° ($D_{20}$: 0.92). The concentrate may be diluted with water to the desired concentration.

(c) Emulsifiable concentrate: 50 parts by weight of a compound of Formula I are mixed with 50 parts by weight of isooctylphenyloctaglycol ether. A clear concentrate is obtained which may be readily emulsified in water and which may be diluted with water to the desired concentration.

Free base and acid addition salt forms of the compounds of Formula I exhibit the same type of activity. Examples of agriculturally acceptable acid addition salt forms are the acetate, benzoate, hydrogen oxalate, hydrochloride and hydrogen sulphate.

The preferred compounds of Formula I are the following, viz:

2-dimethylamino-1,3-bis(1-methoxy-n-butylthio)-propane, 2-dimethylamino-1,3-bis(1-methoxy-n-propylthio)-propane, 2-dimethylamino-1,3-bis(1-ethoxy-ethylthio)-propane, and
2-dimethylamino-1,3-bis(1-isopropoxy-n-propylthio)-propane, and the preferred acid addition salt form thereof is the hydrogen oxalate.

The production of compounds of Formula I will now be described in more detail by way of example. Where temperature is referred to, this is in ° C.

EXAMPLE 1

2-dimethylamino-1,3-bis(isopropoxy-methylthio)-propane (free base form)

The production is effected in an atmosphere of nitrogen.

23.5 g. (0.1 mol) of 1,3-bis(acetylthio)-2-dimethylaminopropane are dissolved in 300 cc. of methanol and a solution of 4.6 g. of sodium in 150 cc. of methanol is added. The mixture is boiled under reflux for 1 hour, the solvent is distilled off and the residue consisting of the disodium salt is suspended in 300 cc. of acetonitrile. 22 g. (0.2 mol) of chloromethyl isopropylether are added dropwise at 10–20° and the mixture is stirred for a further 16 hours, during about 4 of which the mixture is stirred in an atmosphere of nitrogen. The precipitated sodium chloride is removed by suction and the filtrate is evaporated in a vacuum. The residue is taken up in ether, is washed with water, dried over sodium sulphate, and after evaporation of the ether it is fractionated. The substance is obtained in the form of a yellowish oil having a B.P. of 123–125°/0.15 mm.

*Analysis.*—Calcd. for $C_{13}H_{29}NO_2S_2$ (molecular weight 295) (percent): C, 52.8; H, 9.8; N, 4.7; O, 10.8; S, 21.7. Found (percent): C, 53.0; H, 10.1, N, 4.7; O, 11.0; S, 21.8.

In analogous manner to that described above, 2-di-n-pentylamino-1,3-bis(isopropoxy-methylthio)propane may be obtained in free base form.

EXAMPLE 2

2-dimethylamino-1,3-bis(isopropoxy-methylthio)-propane (hydrogen oxalate form)

5.2 g. (0.02 mol) of 2-dimethylamino-1,3-bis(isopropoxy-methylthio)-propane are dissolved in 100 cc. of ether and an excess of a saturated etheral oxalic acid solution is added. The precipitated hydrogen oxalate is removed by suction, is washed with ether and dried. Colourless crystals having a M.P. of 62–64° are obtained.

EXAMPLE 3

2-dimethylamino-1,3-bis(1-ethoxy-n-propylthio)-propane (free base form)

The production is effected in an atmosphere of nitrogen.

To 23.5 g. (0.1 mol) of 1,3-bis(acetylthio)-2-dimethylamino-propane which are dissolved in 300 cc. of methanol, there is added a solution of 4.6 g. of sodium in 150 cc. of methanol. The mixture is boiled under reflux in the course of 90 minutes. The solvent and the resulting acetic acid methyl ester are distilled off in an atmosphere of nitrogen at normal pressure, and then in a vacuum. 300 cc. of dimethylformamide are then added to the residue. 25 g. (0.2 mol) of 1-chloropropyl-ethyl ether are added dropwise at 10–20° and while cooling to the clear solution. After 4 hours the dimethylformamide is removed in a vacuum and the residue is partitioned between water and ether. After washing the etheral phase and drying over sodium sulphate the ether is evaporated and the residue is fractionated. The substance is obtained as a yellowish oil having a B.P. of 106–111°/0.08 mm.

*Analysis.*—Calcd. for $C_{15}H_{33}NO_2S_2$ (molecular weight 322) (percent): C, 55.9; H, 10.3; N, 4.4; O, 9.9; S, 19.9. Found (percent): C, 55.5; H, 10.3; N, 4.7; O, 10.4; S, 20.1.

In analogous manner as described in Examples 1 to 3, the following compounds of Formula I may be obtained.

STARTING MATERIALS

The production of compounds of Formula IV employed as starting material may be effected in an analogous manner to that described in the following example:

1,3-bis(aectylthio)-2-dimethylamino-propane 288 g. (1.5 mol) of 2-dimethylamio-1,3-dichloro-propane-hydrochloride are suspended in 1000 cc. of acetonitrile. 465 g. (4.6 mols) of triethylamine are added dropwise at 0–10° while stirring and subsequently at the same temperature 230 g. (3.0 mols) of thioacetic acid are added. The mixture is then stirred at 20–30° for about 18 hours, cooling with ice being effected when necessary. The hydrochloride of the triethylamine is removed by suction, is washed with a small amount of acetonitrile and the filtrate is evaporated in a vacuum. The residue is dissolved in 1000 cc. of ether and the solution is washed with water. The solution is dried over sodium sulphate, the ether is evaporated and the residue is then fractionated. B.P. 98–102°/0.15 mm.

What is claimed is:

1. A compound of the formula:

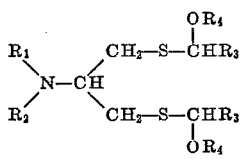

wherein $R_1$ and $R_2$, which are the same or different, are each alkyl of 1 to 5 carbon atoms, $R_3$ is hydrogen or alkyl of 1 to 5 carbon atoms and $R_4$ is alkyl of 1 to 3 carbon atoms, in free base or agriculturally acceptable acid addition salt form.

2. A compound of claim 1, wherein $R_1$ is methyl, $R_2$ is methyl, $R_3$ is hydrogen, methyl, ethyl, n-propyl or isopropyl and $R_4$ is methyl, ethyl, isopropyl or n-propyl.

3. The compound of claim 2, wherein $R_1$, $R_2$ and $R_3$ are each methyl and $R_4$ is ethyl.

4. The compound of claim 2, wherein $R_1$ and $R_2$ are each methyl, $R_3$ is ethyl and $R_4$ is isopropyl.

5. The compound of claim 2, wherein $R_1$ and $R_2$ are each methyl, $R_3$ is n-propyl and $R_4$ is methyl.

6. The compound of claim 2, wherein $R_1$ and $R_2$ are each methyl, $R_3$ is ethyl and $R_4$ is methyl.

7. A compound of claim 1, in hydrogen oxalate form.

References Cited
UNITED STATES PATENTS 3,626,011   7/1968   Bordenca et al. _____ 260—584

LEWIS GOTTS, Primary Examiner

D. R. PHILLIPS, Assistant Examiner

U.S. Cl. X.R.

260—584 C; 424—316, 325